US006317560B1

(12) United States Patent
Kawabata (10) Patent No.: US 6,317,560 B1
(45) Date of Patent: *Nov. 13, 2001

(54) PHOTOGRAPHING SYSTEM CONTAINING SYNCHRONIZING CONTROL DATA FOR CONTROLLING LIGHTING, PHOTOGRAPHY, PRINTING AND GUIDANCE BASED UPON THE USER'S CHOICE OF PHOTOGRAPHING MODE (75) Inventor: Kazuhiro Kawabata, Shinjuku-Ku (JP)

(73) Assignee: Dai Nippon Printing Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/203,517

(22) Filed: Dec. 1, 1998

(30) Foreign Application Priority Data

Dec. 1, 1997 (JP) .................................................. 9-3433640
Sep. 4, 1998 (JP) .................................................. 10-251053

(51) Int. Cl.[7] .................................................. G03B 15/00
(52) U.S. Cl. ....................................... 396/2; 396/3; 396/4
(58) Field of Search .................................. 396/1, 2, 3, 4, 396/5, 6

(56) References Cited

U.S. PATENT DOCUMENTS

| | | | | |
|---|---|---|---|---|
| 3,820,133 | * | 6/1974 | Adorney et al. | 396/1 |
| 5,016,035 | * | 5/1991 | Myles, Jr. | 396/1 |
| 5,196,876 | * | 3/1993 | Thayer | 396/2 |
| 5,500,700 | * | 3/1996 | Massarsky | 396/2 |
| 5,534,963 | * | 7/1996 | Adolphi et al. | 396/5 |
| 5,577,179 | * | 11/1996 | Blank | 396/2 |
| 5,587,740 | * | 12/1996 | Brennan | 396/3 |
| 5,589,902 | * | 12/1996 | Gruel et al. | 396/3 |
| 5,696,995 | * | 12/1997 | Hunag et al. | 396/2 |
| 5,778,258 | * | 7/1998 | Zamoyski | 396/2 |
| 6,047,130 | * | 4/2000 | Oles | 396/1 |

* cited by examiner

Primary Examiner—David M. Gray
(74) Attorney, Agent, or Firm—Parkhurst & Wendel, LLP (57) ABSTRACT A photographing system comprises a photographing box (16) capable of accommodates a user (17) and of allowing the user (17) to change a pose, a lighting means (2) installed in the photographing box (16), and a photographing means (3) installed in the photographing box (16). A printing means (8) prints out pictures on the basis of photographic data provided by the photographing means (3). The lighting means (2), the photographing means (3) and the printing means (8) are controlled by a synchronizing control means (9).

17 Claims, 7 Drawing Sheets

PHOTOGRAPHING SYSTEM CONTAINING SYNCHRONIZING CONTROL DATA FOR CONTROLLING LIGHTING, PHOTOGRAPHY, PRINTING AND GUIDANCE BASED UPON THE USER'S CHOICE OF PHOTOGRAPHING MODE

BACKGROUND OF THE INVENTION

1. Field of the Invention

The present invention relates to a photographing system and, more particularly, to a photographing system capable of creating a photographic environment analogous to that provided by a photo studio and of enabling simple and instant production of photographs.

2. Description of the Related Art

When a photo studio is used for photographing, a special effect can be produced by lighting, background, properties, interior decorating articles and such. Therefore, it is usual for the field of commercial photography to use a photo studio for photographing. When ordinary people have their photographs taken by a professional photographer in a photo studio, the combined effect of the skill of the professional photographer and the photographic equipment of the photo studio makes the quality of the photographs taken in the photo studio apparently superior to that of photographs taken by amature photographers.

However, ordinary people rarely have an opportunity to photograph in a photo studio. For instance, ordinary people have an opportunity to use a photo studio for taking commemorative photographs only on a special occasion, such as the day of entrance ceremony, the New Year's Day, a birthday, a wedding day or the like.

There are some reasons that make the use of photo studios difficult. For example, • photographing charge is high because a professional photographer photographs in a photo studio, • ordinary people are unfamiliar with photographing in various modes other than photographing modes for commemorative photographs, such as a photographing mode in which people are required to pose and make expressions according to instructions given to them by the professional photographer, • people must bear a large burden imposed on them to create a photographing environment (arrangement of a lighting system, background, properties, interior decorating articles and the like) and preparing themselves for photographing, • it takes a long time to obtain printed pictures, • it is difficult to confirm the result of photographing on the spot and it is not easy to retake photographs, and • people cannot take private photographs which they want to keep confidential.

SUMMARY OF THE INVENTION

Accordingly, it is an object of the present invention to provide a photographing system which can be used at a low, rental fee, enables photographing in diversified modes, provides prepared stages, produces printed pictures instantly, facilitates retaking and enables private photographing.

One aspect of the present invention, a photographing system comprises a photographing box capable of accommodating a user, i.e., a subject, therein and allowing the user to change pose therein; a lighting means installed in the photographing box; a photographing means installed in the photographing box and capable of photographing the user and of producing photographic data; a printing means for producing printed pictures on the basis of photographic data given thereto by the photographing means; and a synchronizing control means for controlling the lighting means, the photographing means and the printing means.

In the present invention, the photographing system may further comprise a photographic data storage means for storing the photographic data provided by the photographing means; an editing means for editing the photographic data read from the photographic data storage means to provide edited data; edited data storage means for storing the edited data; a display means for displaying a picture corresponding to the photographic data and/or the edited data by reading the photographic data stored in the photographic data storing means and/or the edited data stored in the edited data storing means; an audio data storage means for storing audio data; an audio reproducing means for reproducing sounds represented by the audio data stored in the audio data storage means and delivering the reproduced sounds by a speaker; and a synchronizing control data storage means for storing synchronizing control data; wherein the synchronizing control means controls the lighting means, the photographing means, the printing means, the photographic data storage means, the editing means, the edited data storage means, the display means, the audio data storage means and the audio reproducing means on the basis of the synchronizing control data read from the synchronizing control data storage means.

According to the present invention, the lighting means emits light, the photographing means produces photographic data representing a photograph of the user, the photographic data storage means stores the photographic data, the editing means edits the photographic data stored in the photographic data storage means and provides edited data, the edited data storage means stores the edited data, the display means reads the photographic data stored in the photographic data storage means and/or the edited data stored in the edited data storage means and displays a picture, the audio data storage means stores audio data, the audio reproducing means reads the audio data from the audio data storage means and delivers sounds represented by the audio data by the speaker, the synchronizing control data storage means stores the synchronizing control data, and the synchronizing control means controls those components on the basis of the synchronizing control data.

These processing means of the photographing system carry out all photographic processes synchronously on the basis of the relevant data without requiring any professional photographer. Accordingly, the photographing system c(an be used at a low rental fee, enables photographing in various photographing modes, provides prepared stages, produces printed pictures instantly, facilitates retaking and enables private photographing.

The lighting means may comprise a plurality of lighting units disposed for lighting at different lighting angles, respectively, and the lighting units disposed for lighting at the lighting angles specified by the synchronizing control means may be used for lighting.

According to the present invention, the user can be lighted from lighting directions suitable for the pose and condition of the user according to the progress of a predetermined photographing process.

The lighting means may comprise stroboscopic light sources capable of emitting an instantaneous flash of light, and ordinary light. sources capable of continuously emitting light.

According to the present invention, the stroboscopic light sources and the ordinary light sources are used in various combinations to realize various lighting modes. For example, both an intense lighting mode suitable for a photographing moment and a moderate lighting mode for giving a comfortable psychological effect on the user between photographing periods can be realized.

The photographing means may comprise a plurality of photographing units installed for photographing at different camera angles, respectively, and the photographing units selected by the synchronizing control means may be used for photographing.

According to the present invention, the user can be photographed from photographing directions suitable for the pose and condition of the user according to the progress of a predetermined photographing process.

The photographing box may internally be provided with a movable stage and a stage moving means for changing the position and the angle of the movable stage, the photographing means may be fixedly held on the movable stage, and the synchronizing control means may control the stage moving means to move the movable stage to set a specified camera angle.

According to the present invention, the user can be photographed from a photographing direction suitable for the pose and condition of the user according to the progress of a predetermined photographing process.

The photographing system may further comprise a photographing mode selecting means for producing a photographing mode selecting data specifying a photographing mode selected out of a plurality of photographing modes, the synchronizing control data storage means may give synchronizing control data selected on the basis of the photographing mode selecting data provided by the photographing mode selecting means to the synchronizing control means.

According to the present invention, the photographing mode selecting means produces photographing mode selecting data specifying a photographing mode in the plurality of photographing modes according to input photographing mode specifying data, and the synchronizing control data is given to the synchronizing control means on the basis of the photographing mode selecting data. Thus, the synchronizing control data corresponding to the selected photographing mode in the plurality of photographing processes stored in a storage means is given to the synchronizing control means to carry out photographing operations in the selected photographing mode.

The synchronizing control means may provide an edit command signal in a predetermined series on the basis of synchronizing control data read from the synchronizing control data storage means, and the editing means may produce edited data by an editing process specified by the edit command signal.

According to the present invention, the editing process for editing the photographic data can be carried out according to the progress of a predetermined photographing process to provide the edited data.

The synchronizing control means may provide a display command signal in a predetermined series on the basis of the synchronizing control data read from the synchronizing control data storage means, and the display means may read the photographic data from the photographic data storage means and may display a picture in response to the display command signal.

According to the present invention, a picture corresponding to the photographic data and/or the edited data can be displayed by the display means according to the progress of a predetermined photographing process.

The photographing system may further comprise a cataloged data storage means for storing a plurality of previously cataloged data, and the editing means may produce edited data by combining photographic data on the basis of predetermined cataloged data read from the cataloged data storage means.

According to the present invention, the editing means receives the predetermined cataloged data from the cataloged data storage means and produces edited data by combining photographic data.

The cataloged data includes background picture data and/or foreground picture data.

According to the present invention, the editing means combines a background picture and a foreground picture.

The editing means carries out an arraying process for producing edited data by arraying a plurality of photographic data and/or plurality of edited data.

According to the present invention, the editing means produces edited data produced by arraying a plurality of photographic data and/or a plurality of edited data by the arraying process.

The printing means may receive edited data processed by the arraying process by the editing means and may print out a picture represented by the edited data.

According to the present invention, the printing means receives the edited data processed by the arraying process, and prints out a picture represented by the edited data.

The display means may display a plurality of pictures on the basis of edited data processed by the arraying process by the editing means and may be provided with a picture selecting means for producing a picture selecting data specifying a picture selected by a selection input out of the plurality of pictures displayed in an array by the display means, and the printing means may receive edited data specified by the picture selecting data from the edited data storage means and may print out a picture represented by the edited data.

According to the present invention, edited data processed by the arraying process is displayed by the display means, the picture selecting means produces image selecting data specifying a picture selected from the plurality of pictures displayed in an array by the display means in response to the selection input, and the printing means receives edited data specified by the picture selecting data from the edited data storage means and prints out a picture represented by the edited data. Thus, a photographed picture and an edited picture selected from the pictures displayed in an array can be printed out.

The printing means produces a printed picture on the basis of a print charge collection signal indicating the collection of a print charge, and the picture selection data.

According to the present invention, a print of a desired picture can be obtained by paying only a charge for the desired picture.

The synchronizing control means may start its operation upon the confirmation of reception of both a rental fee collection signal indicating the collection of a rental fee, and a start signal entered by a user.

According to the present invention, the rental fee can automatically be collected and the user is able to start using the photographing system after preparations have been completed.

The photographing system may further comprise a taking position indicating means disposed in the photographing box to indicate a taking position for guiding a user to the taking position.

The photographing system may further comprise a guidance means disposed in the photographing box to guide a user for posing and such by images and/or sounds.

The printing means may selectively determine the size and/or the number of pictures and may print the pictures on a sheet of photographic paper of a set size.

The photographing box may be soundproof.

DESCRIPTION OF THE PREFERRED EMBODIMENTS

First Embodiment

Figure 1:
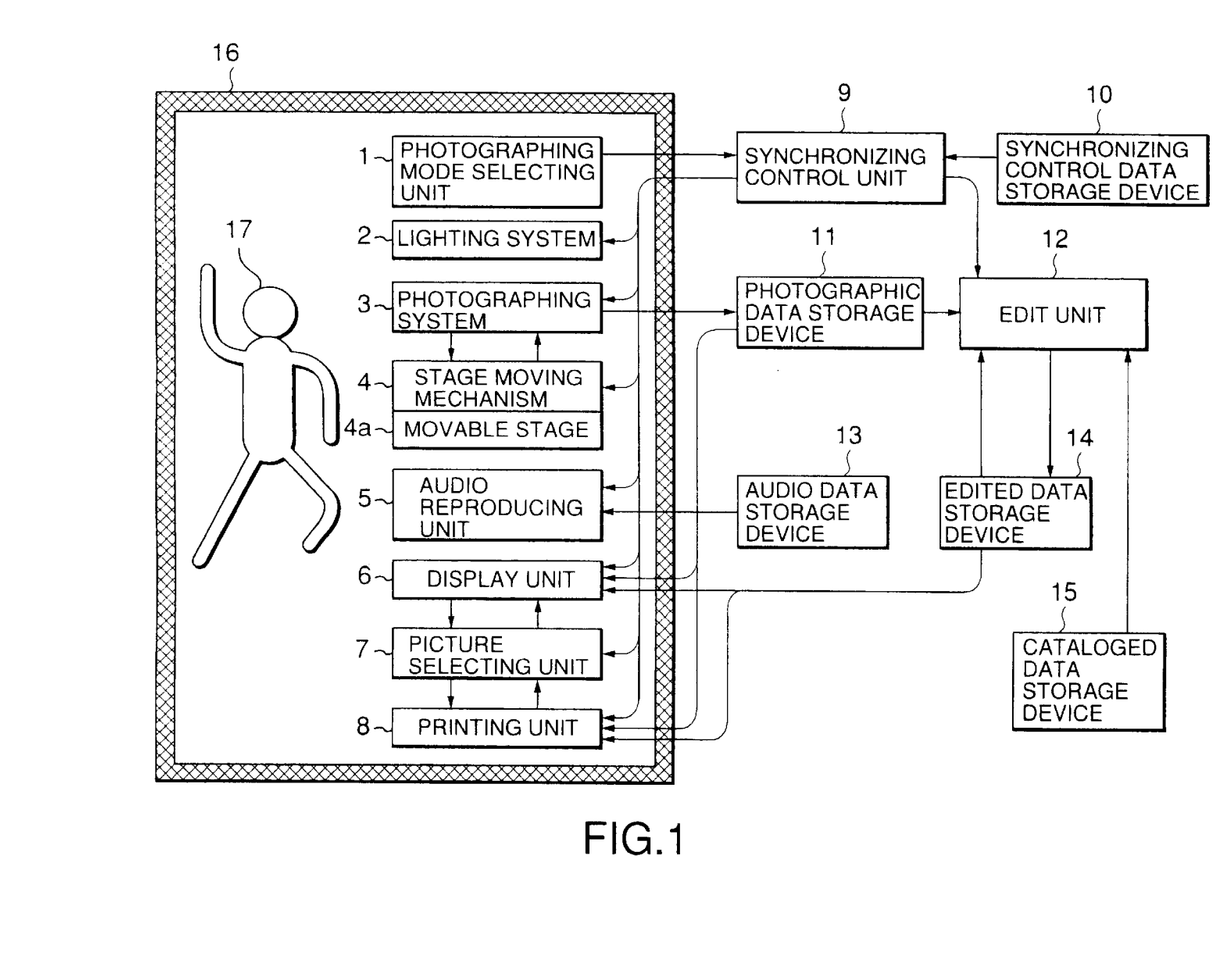
FIG. 1 is a block diagram of a photographing system in a first embodiment according to the present invention.

Referring to FIG. 1 showing a photographing system in a first embodiment according to the present invention, the photographing system comprises a soundproof photographing box 16 capable of completely accommodating a user 17, i.e., a subject, therein and defining a space large enough for the user 17 to freely change an entire pose of the user 17, a lighting system 2 installed in the photographing box 16, and a photographing system 3 installed in the photographing box 16 to photograph the user 17 and to produce photographic data. Installed also in the photographing box 16 are a photographing mode selecting unit 1, a movable stage 4a holding the photographing system 3, an audio reproducing unit 5, a display unit 6 for displaying pictures, a picture selecting unit 7 for selecting a picture, and a printing unit 8 for printing pictures. The photographing mode selecting device 1, the lighting system 2, the photographing system 3, the movable stage 4a, the audio reproducing unit 5, the display unit 6, the picture selecting unit 7 and the printing unit 8 are controlled by a synchronizing control unit 9 controlled on the basis of synchronizing control data stored in a synchronizing control data storage device 10. Photographic data produced by the photographing system 3 is stored in a photographic data storage device 11 and is edited by an edit unit 12. The edit unit 12 receives cataloged data from a cataloged data storage device 15. Edited data produced by the edit unit 12 is stored in an edited data storage device 14. The audio reproducing unit 5 reproduces sounds represented by audio data provided by an audio data storage device 13. Some of the components of the photographing system are disposed in the soundproof photographing box 16 and the rest are disposed outside the soundproof photographing box 16 as shown in FIG. 1. All the components of the photographing system need not necessarily be installed inside the soundproof photographing box 16.

Referring to FIG. 1, the photographing mode selecting unit 1 produces a photographing mode selecting data specifying a photographing mode selected from a plurality, of photographing modes on the basis of selection data entered into the photographing mode selecting unit 1. The photographing mode selecting unit 1 may be a transparent touch switch panel placed on the display screen of a display included in a personal computer and serving as the display unit 6, which will be described later. The designations of the plurality of photographing modes are displayed on the display screen of the display unit 6. The user touches a pair of the transparent touch switch panel coinciding with the designation of a desired photographing mode, the transparent touch switch panel operates to enter selection data. The transparent touch switch panel gives coordinate data to the personal computer, and then the personal computer produces photographing mode selection data specifying the selected photographing mode on the basis of the coordinate data.

Figure 2:
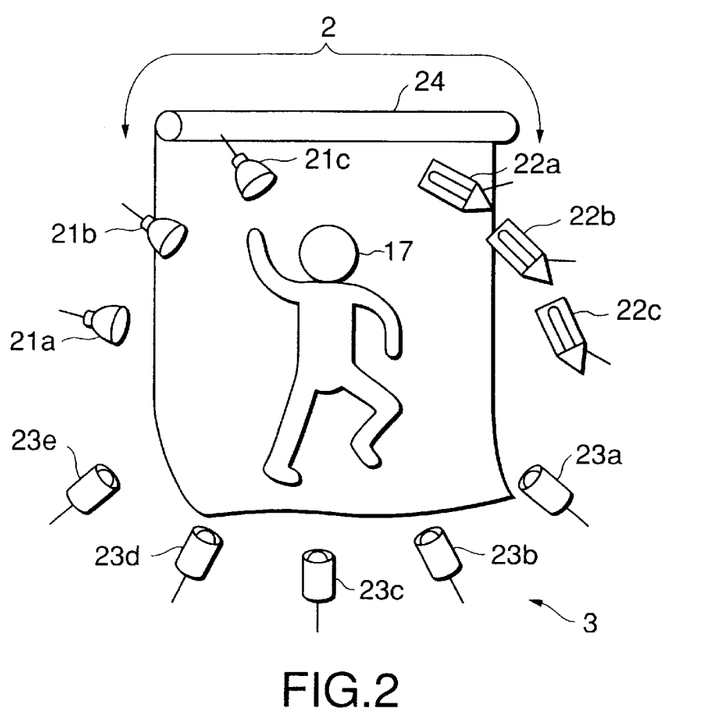
FIG. 2 is a pictorial view of a space defined by a photographing box.

The lighting system 2 comprises a plurality of lighting units installed at different lighting angles, respectively, as shown in FIG. 2. The lighting units installed at the lighting angles specified by an lighting command signal provided by the synchronizing control unit 9 operate in synchronism with the lighting command signal. The plurality of lighting units of the lighting system 2 have stroboscopic light sources 21a, 21b and 21c, such as xenon lamps, and ordinary light sources 22a, 22b and 22c capable of continuously emitting light, such as halogen lamps or metal halide lamps, respectively.

The photographing system 3 may comprise still cameras each comprising, for example, a solid-state image sensor, such as a CCD, a controller operated by external signals, an A/D converter, and an image data storage device. It is more preferable that the photographing system 3 comprises cameras capable of producing animated pictures and video signals in addition to still pictures. The video signals provided by such cameras can be displayed on a monitor TV set, not shown. If a mirror is attached to the inner surface of a wall of the photographing box 16 on the side of the photographing system 3, the user 17 is able to confirm the pose.

The photographing system 3 operates in synchronism with a photographing command signal provided by the synchronizing control unit 9 and photographs the user 17 at a camera angle specified by the photographing command signal to take a photograph of the user 17, and provides photographic data by subjecting the photograph to A/D conversion. The photographing system 3 comprises a plurality of photographing units 23a, 23b, 23c, 23d and 23e, such as CCD cameras, disposed for photographing at, different camera angles, respectively, as shown in FIG. 2, and uses one of the photographing units 23a to 23e, suitable for photographing at a camera angle specified by the photographing command signal. Another method of photographing the user 17 at a specified camera angle moves and sets the movable stage 4a installed in the soundproof photographing box 16 at a position and an angle corresponding to the specified camera angle by a stage moving mechanism 4. The photographing units 23a to 23e of the photographing system 3 are fixedly held on the movable stage 4a. The stage moving mechanism 4 moves the movable stage 4a so that one of the photographing units 23a to 23e is set at a position corresponding to the specified camera angle. The stage moving mechanism 4 comprises an X-Y-Z moving mechanism, and a rotary mechanism having two perpendicular axis. The stage moving mechanism 4 may be a robot Alan.

The audio reproducing unit 5 operates in synchronizing with an audio reproduction command signal provided by the synchronizing control unit 9, and has a speaker capable of reproducing sounds represented by audio data stored in the audio data storage device 5 and specified by the audio reproduction command signal. The audio reproducing unit 5 uses the multimedia data processing functions of the personal computer for dealing with audio data, video data, MIDI standards and music CDs. The audio data storage device 13 is a storage device included in the personal computer or a storage medium, such as data CDs, music CDs and the like. The audio reproducing unit 5 may employ an audio device (audio/video device) provided with an external control signal receiving unit, such as a laser disk drive, a CD drive or a DVD drive. The audio data storage device 13 has storage mediums for storing audio data to be reproduced by the audio reproducing unit 5. The audio reproducing unit 5 may be controlled by operating data given by a personal computer or a programmable sequence controller to the external control signal receiving unit.

The display unit 6 operates in synchronism with a display command signal provided by the synchronizing control unit 9. The display unit 6 reads photographic data stored in the photographic data storage device 11 and specified by the display command signal and/or edited data stored in the edited data storage device 14 and specified by the display command signal, and displays a picture represented by the photographic data and/or the edited data. The display unit 6 comprises a data processing apparatus, such as a personal computer, and a display incorporated into the data processing apparatus.

If the data processing apparatus provided with a display and serving as the display unit 6 is a main controller (synchronizing control means) for controlling the general operations of the photographing system, the data processing apparatus generates the display command signal and processes the same. If the main controller is a data processing apparatus other than the data processing apparatus included in the display unit 6, such as a programmable sequence controller, the display unit 6 receives the display command signal from the external data processing apparatus. and displays a picture.

The display unit 6 displays edited data representing an array of pictures (FIG. 3) produced by an arraying process by the edit unit 12. The picture selecting unit 7 produces a picture selecting data specifying a selected one of the plurality of pictures displayed in an array by the display unit 6. The picture selecting unit 7, similarly to the photographing mode selecting unit 1, may be a transparent touch switch panel placed on the display screen of the display of a personal computer. The user 17 touches a part of the transparent touch switch panel corresponding to a selected picture in the plurality of pictures displayed by the display unit 6 to give a picture selection signal indicating the coordinates of the selected picture to the personal computer. Then, the personal computer produces picture selecting data specifying the selected picture on the basis of the picture selection signal indicating the coordinates of the selected picture. After the picture has been selected by operating the picture selecting unit 7, the display unit 6 displays only the selected picture in an enlarged size on the display screen. The user 17 is able to recognize the quality of the picture displayed on the display screen of the display unit 6. When the transparent touch switch panel is touched again with the selected picture displayed on the display screen, the array of the plurality of pictures is displayed again and the previously produced picture selecting data is deleted. When another one of the plurality of displayed pictures is selected, picture selecting data specifying the selected picture is produced, and only the selected picture is displayed in an enlarged size.

The printing unit 8 reads the photographic data stored in the photographic data storage device 11 and/or the edited data stored in the edited data storage device 14 specified by the picture selecting data produced by the picture selecting unit 7, and prints out the selected picture. The printing unit 8 prints out the selected picture provided that both the picture selecting data and a print fee collection signal indicating the collection of a print fee have been given thereto. The printing unit 8 comprises a generally known printing unit which receives digital image data and operates for printing on the basis of the digital image data, such as a sublimation thermal transfer color printing unit, a fusion thermal transfer color printing unit or an ink-jet color printing unit. The print of the picture is available in a selected size, such as a standard size, a floppy disk size, a card size or the like.

The synchronizing control unit 9 provides a lighting command signal, a photographing command signal, an audio command signal, an edit command signal, a display command signal and such in a predetermined sequence based on synchronizing control data read from the synchronizing control data storage device 10. The synchronizing control data storage unit 10 stores a plurality of sets of synchronizing control data respectively corresponding to the plurality of photographing modes. The synchronizing control data storage device 10 gives the synchronizing control data specified by the photographing mode selecting data produced by the photographing mode selecting unit 1 to synchronizing control unit 9, and the synchronizing control unit 9 provides those command signals in the predetermined sequence specified by the synchronizing control data. The synchronizing control unit 9 starts its operation upon the confirmation of reception of both a rental fee collection signal indicating the collection of a rental fee, and a start signal entered by the user 17.

The synchronizing control unit 9 comprises a data processing apparatus, such as a programmable sequence controller or a personal computer. If the synchronizing control unit 9 comprises a programmable sequence controller, the synchronizing control data storage device 10 is a storage device included in the programmable sequence controller.

The photographic data storage device 11 stores photographic data produced by the photographing system 3. The cataloged data storage device 15 stores cataloged data. The cataloged data includes background scenery data, foreground scenery data, title data, character data, pattern data and the like. The edit unit 12 processes photographic data by an editing process to produce the edited data. The edited data is stored in the edited data storage device 14. These storage devices are those of personal computers or a microcomputer system.

The edit unit 12 operates in synchronism with an edit command signal provided by the synchronizing control unit 9 and carries out an edit process specified by the edit command signal to produce edited data. The edit unit 12 reads predetermined cataloged data from the cataloged data storage device 15 and combines the cataloged data and the photographic data stored in the photographic data storage device 11 for an editing process to produce edited data. The edit unit 12 carries out an arraying process to produce edited data by arraying the plurality of photographic data stored in the photographic data storage device 11 and/or the plurality of edited data stored in the edited data stored in the edited data storage device 14. The edit unit 12 also carries out a color tone correcting process to produce edited data by correcting the color tone, i.e., the saturation and the lightness, of the photographic data. The color tone correcting process modifies the colors of the skin, the blue sky and the like into preferable colors similar to memory colors. The edit unit 12 is a combination of a piece of hardware, such as a data processing apparatus (personal computer), and software.

The soundproof photographing box 16 defines a photographing space large enough for the user 17 to move therein, and the audio reproducing unit 5 including a speaker is installed in the soundproof photographing box 16. The soundproof photographing box 16 isolates sounds generated in the photographing space and those generated outside the photographing space from each other. The soundproof photographing box 16 is formed of generally known building materials capable of sound insulation and sound absorption. The sound insulating ability of the soundproof photographing box 16 expressed in attenuation of sound power (square of amplitude) is 10 dB or above (ability to attenuate sound power to 1/10 or below), preferably, 20 dB or above (ability to attenuate sound power to 1/100 or below).

FIG. 2 shows, by way of example, the arrangement of the components in the photographing space defined by the soundproof photographing box 16. The user 17 is in the soundproof photographing box 16, and the stroboscopic light sources 21a to 21c which produce flashes of light, the ordinary light sources 22a to 22c capable of continuously emitting light, the photographing units 23a to 23e (CCD cameras), and a background screen 24 are arranged in the photographing space. In the constitution of the photographing space shown by way of example in FIG. 2, the lighting system 2 comprises the plurality of stroboscopic light sources 21a to 21c and the plurality of ordinary light sources 22a to 22c. The lighting system 2 makes those light sources emit light selectively according to the progress of a predetermined photographing process for diversified lighting. The light sources are provided with filters to emit light rays of different colors, respectively. The photographing system 3 employs CCD cameras as the photographing units 23a to 23e. The photographing units 23a to 23e are disposed for photographing at different camera angles. Pictures are drawn projected on the background screen 24 to use the pictures as a background for photographing. If the edit unit 12 produces background pictures by a picture synthesizing process, the background screen 24 is unfired and is colored in a specific color, such as solid blue. The edit unit 12 replaces the pixels of the specific color of the photographic data with the pixels of background pixel data for the picture synthesizing process.

Figure 3:
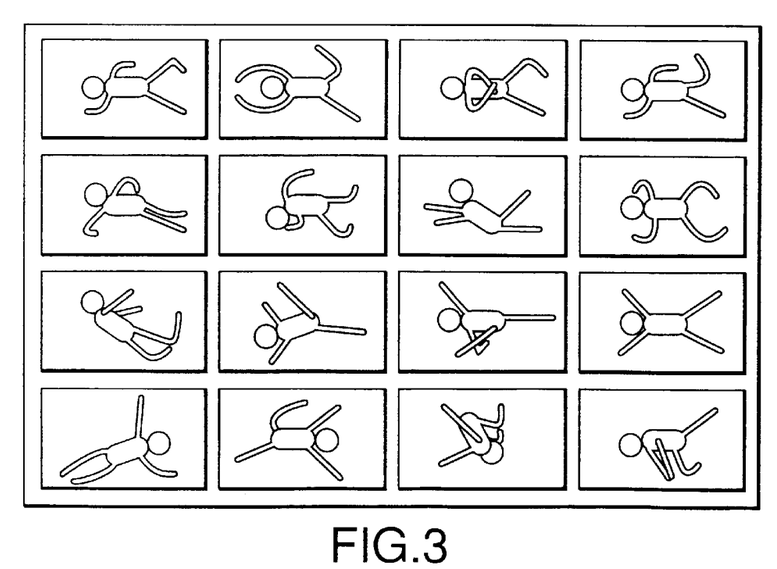
FIG. 3 is a pictorial view of an array of printed pictures.

FIG. 3 shows a print of an array of pictures by way of example. As shown in FIG. 3, the user 17 is photographed in various poses. Although not shown in FIG. 2, sounds are delivered by the speaker of the audio reproducing unit 5 in the photographing space. The speaker delivers both pleasant music numbers and narrative instructions similar to that which will be given by a professional photographer. The user 17 takes different poses sequentially following the narrative instructions. As mentioned above, a picture is displayed on the display screen of the display unit 6 disposed in the photographing space. Image-building pictures for producing a desirable atmosphere, and exemplary poses and expressions may be displayed by the display unit 6 for reference and guidance.

Figure 4:
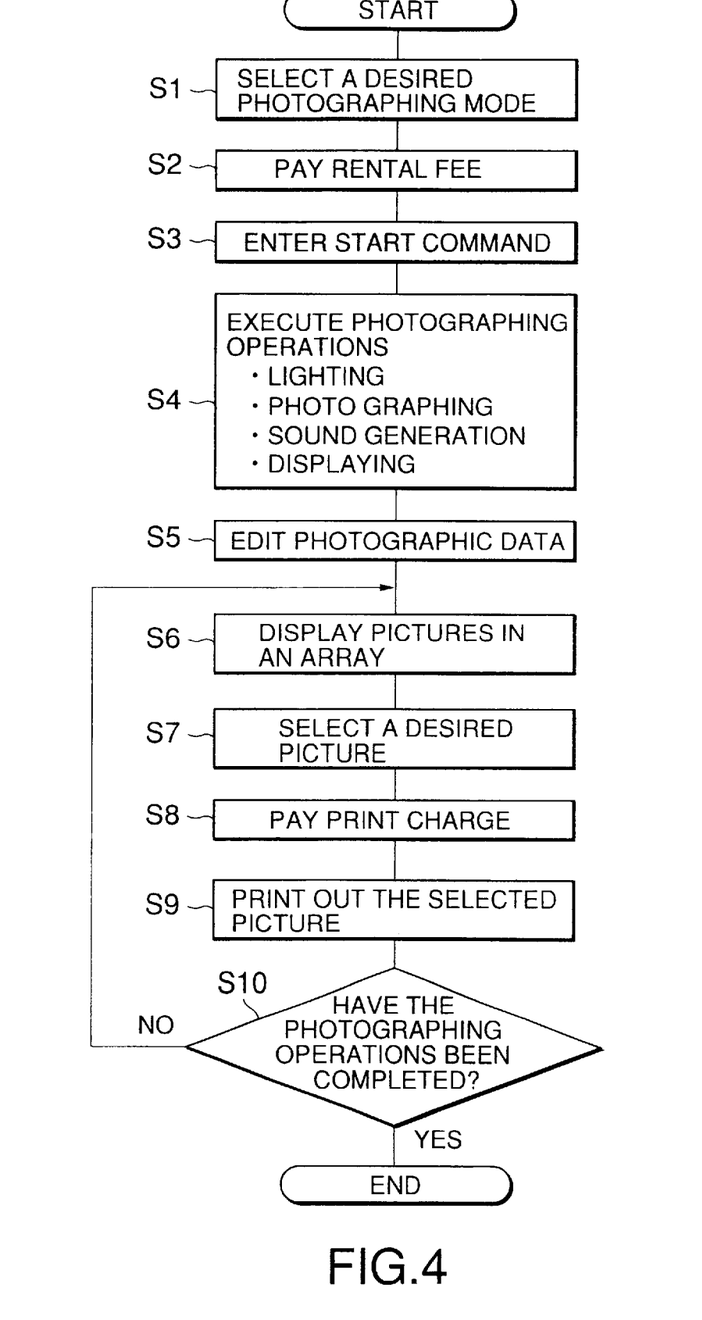
FIG. 4 is a flow chart of an operating procedure for operating the photographing system of FIG. 1.

The operation of the photographing system of the constitution shown in FIG. 1 will be described hereinafter. FIG. 4 is a flow chair of an operating procedure for operating the photographing system. In step S1, the user 17 touches with a finger a part of the transparent touch switch panel of the photographing mode selecting unit 1 corresponding to the name of a desired photographing mode in a plurality of photographing modes displayed on the display screen to select the desired photographing mode. The photographing modes include, for example, "normal mode", "professional photographer mode", "professional photographer sexy mode" ",sweet mode", "montage picture mode", "commemorative photographing mode", "testimonial photograph mode" and the like, which will be described later.

In step S2, coins and/or bank notes of a value equivalent to a rental fee for the selected photographing mode are deposited through a slot in an automatic rental fee collecting machine. In step S3, the user 17 enters a start command after the user 17 has become ready for photographing. The start command is entered by operating the transparent touch switch panel on the display of the display unit 6 or by depressing a start button. If any start command is not entered in a predetermined time, for example, three minutes, a timer starts the photographing arrangement automatically. In step S4, a photographing process for the selected photographing mode is started. The lighting system 2, the photographing system 3, the audio reproducing unit 5 and the display unit 6 execute their functions according to a control program based on the processes for the selected photographing mode. The control program is stored in the synchronizing control data storage device 10. The synchronizing control unit 9 executes the control program to control the lighting system 2, the photographing system 3, the audio reproducing unit 5 and the display unit 6.

The photographing system 3 photographs the user 17 and stores photographic data on a picture of the user 17 in the photographic data storage device 11. In step S5, the edit unit 12 processes the photographic data by a predetermined editing process to produce edited data and stores the edited data in the edited data storage device 14. The cataloged data stored in the cataloged data storage device is used when producing the edited data. The display unit 6 displays the photographic data, the edited data and other necessary data. The foregoing processes are carried out according to a program. An arraying process for arraying the plurality of photographic data provided by the photographing system 3 and/or the edited data produced by subjecting the photographic data to a picture composing process in an array of pictures is executed also in step S5 to produce an array of pictures. In step S6, the array of pictures is displayed by the display unit 6. In step S7, a desired picture among the plurality of pictures displayed in the array is selected by operating the picture selecting unit 7 placed on the display screen of the display of the display unit 6; that is, a part of the picture selecting unit 7 corresponding to the desired picture displayed on the display screen is touched with a finger to enter a picture selection input. Then, the display unit 6 displays only the selected picture in an enlarged size. The user 17 examines the selected picture displayed in an enlarged size, and then step S8 is executed if the user 17 accepts the selected picture as satisfactory. If the user 17 docs not accept the selected picture, the user 17 touches a part of the picture selecting device 7 corresponding to a part of the displayed selected picture or an indication "Cancel print output". Then, the display unit 6 displays the array of the plurality of pictures again. If the user 17 does not need any printed picture, the user 17 touches a part of the picture selecting device 7 corresponding to an indication "End without printing". Then, only the array of pictures as shown in FIG. 3 is printed out, and the control program is ended. In step S8, coins and/or bank notes, or special chips of a value equivalent to a print fee are deposited through a slot in the automatic rental fee collecting machine. Subsequently, a print of the selected picture is delivered by the printing unit 8 in step S9. In step S10, the user 17 selects the continuation of a printing process or the end of the printing process by a method similar to the foregoing selecting methods. If the continuation of the printing process is selected in step S10, the control program returns to step S6 and the foregoing steps arc repeated. If the end of the printing process is selected in Step S10, the control program is ended to stop the operation of the photographing system. If another photographing mode is selected in step S1, the series of operations is started again.

The photographing modes will be described below.

A: Normal Mode

A desired background scenery is displayed on the screen 24. The variation of camera angle and lighting is limited to the least extent to achieve photographing on a considerably high level. A plurality of photographs, such as twenty-seven photographs, of the user 17 in desired poses and expressions are taken successively.

B: Professional Photographer Mode

Instructions on expressions and poses are given in professional photographer's speech through the speaker for each photographing cycle, and the user 17 acts following the instructions. The stroboscopic light sources are actuated and a shutter sound is generated every photographing cycle to produce the illusion of an actual photo studio which is used by professional photographers.

C: Professional Photographer See Mode

A photographing procedure basically the same as that to be carried out in the professional photographer mode is carried out. Prints of pictures which cannot be printed in the ordinary DPE shops, such as nude pictures and private pictures can be printed Sound effects (music and voices), light effects and the like are used to stir up sexy feeling. The photographic data is processed by a color tone correcting process to reproduce the colors of the skin, such as brownish colors, pinkish colors and whitish colors, in beautiful colors.

D: Sweet Mode

A photographing procedure basically the same as that to be carried out in the professional photographer mode is carried out. Two persons are photographed in a two-shot. Sound effects (music and voices), light effects and the like are used to produce a sweet environment. The editing process uses soft-focus techniques to print a picture becoming a two-shot.

E: Montage Picture Mode

Composite photographic data is composed by combining photographic data on pieces of scenery selected out of pieces of the scenery of famous domestic and foreign sights, street scenes, pictures of schools, and landscapes.

F: Commemorative Photographing Mode

Commemorative pictures commemorating special occasions, such as Shichigosan festival, i.e., a festival for children of three, five and seven years of age, Omiyamairi celebration, i.e., visiting a shinto shrine to pray for the happiness of children, and birthdays, are printed out in prints of a large size, such as sheet size A4.

G: Testimonial Photograph Mode

A lighting angle and a camera angle suitable for taking testimonial photographs are used, and trimmed prints are produced.

As is apparent from the foregoing description, according to the present invention, the photographing system charges a low rental fee, enables photographing in various photographing modes, provides prepared stage effects, produces prints instantly, facilitates the repetition of the photographing cycle for retaking and enables private photographing.

The lighting system comprises the plurality of lighting units disposed at different lighting angles, and operates in synchronism with a lighting command signal. The lighting units installed at the lighting angles specified by the lighting command signal provided by the synchronizing control unit 9 operate in synchronism with the lighting command signal.

The plurality of lighting unites of the lighting system 2 have stroboscopic light sources 21$a$, 21$b$ and 21$c$, such as xenon lamps, and ordinary light sources 22$a$, 22$b$ and 22$c$ capable of continuously emitting light, such as halogen lamps or metal halide lamps, respectively. Thus, the lighting system 2 carries out lighting operations to light the user at lighting directions suiting the pose and condition of the user for diversified lighting according to the progress of a predetermined photographing process. The lighting units having the stroboscopic light sources and the ordinary light sources can be used in combination to realize diversified lighting modes.

Since the photographing system comprises the plurality of photographing units disposed for photographing at the different camera angles, respectively, the photographing units for photographing at the camera angles suiting the pose and condition of the subject can be used according to the progress of a predetermined photographing process.

Since the photographing system is provided with the photographing mode selecting unit to be operated to select a desired photographing mode out of the plurality of photographing modes, photographing operations can be carried out according to the progress of the predetermined photographing process designed for the selected photographing mode.

Since the synchronizing control unit provides edit command signals in a predetermined sequence on the basis of synchronizing control data, the edit process of editing the photographic data can be carried out according to the progress of the predetermined photographing process to produce the edited data.

Since the synchronizing control unit provides display command signals in a predetermined sequence on the basis of the synchronizing control data, the display unit is able to display pictures represented by the photographic data and/or the edited data according to the progress of the predetermined photographing process.

Since the photographing system is provided with the cataloged data storage device for storing the plurality of cataloged data, the edit unit reads the cataloged data from the cataloged data storage device, and combines the cataloged data and the photographic data to produce edited data.

A background scenery and a foreground scenery can be composed by the edit unit by combining the cataloged data.

Since the edit unit carries out the arraying process for arraying the plurality of photographic data and the plurality of edited data to produce the edited data, the plurality of photographic data and the plurality of edited data can be arrayed to produce a single piece of edited data.

The printing unit receives the edited data produced by the arraying process and prints out pictures.

The display unit displays pictures represented by the edited data produced by the arraying process, the picture selecting device provides a picture selecting data specifying a selected picture among the plurality of pictures displayed by the display unit, and the printing unit receives the photographic data or the edited data representing the selected picture specified by the picture selecting data and prints the selected picture. Thus, the picture selected out of the pictures displayed in an array and represented by the graphic data or the edited data can be printed.

The printing unit prints out a picture provided that both the picture selecting data and a print fee collection signal indicating the collection of a print fee have been given thereto. Therefore, a print of the selected picture can be obtained when only a charge for the selected picture is paid.

The synchronizing control unit starts its operation upon the confirmation of reception of both a rental fee collection signal indicating the collection of a rental fee, and a start signal entered by the user. Therefore, the rental fee can automatically be collected and the photographing system can be started after the user has become ready.

Second Embodiment

Figure 5:
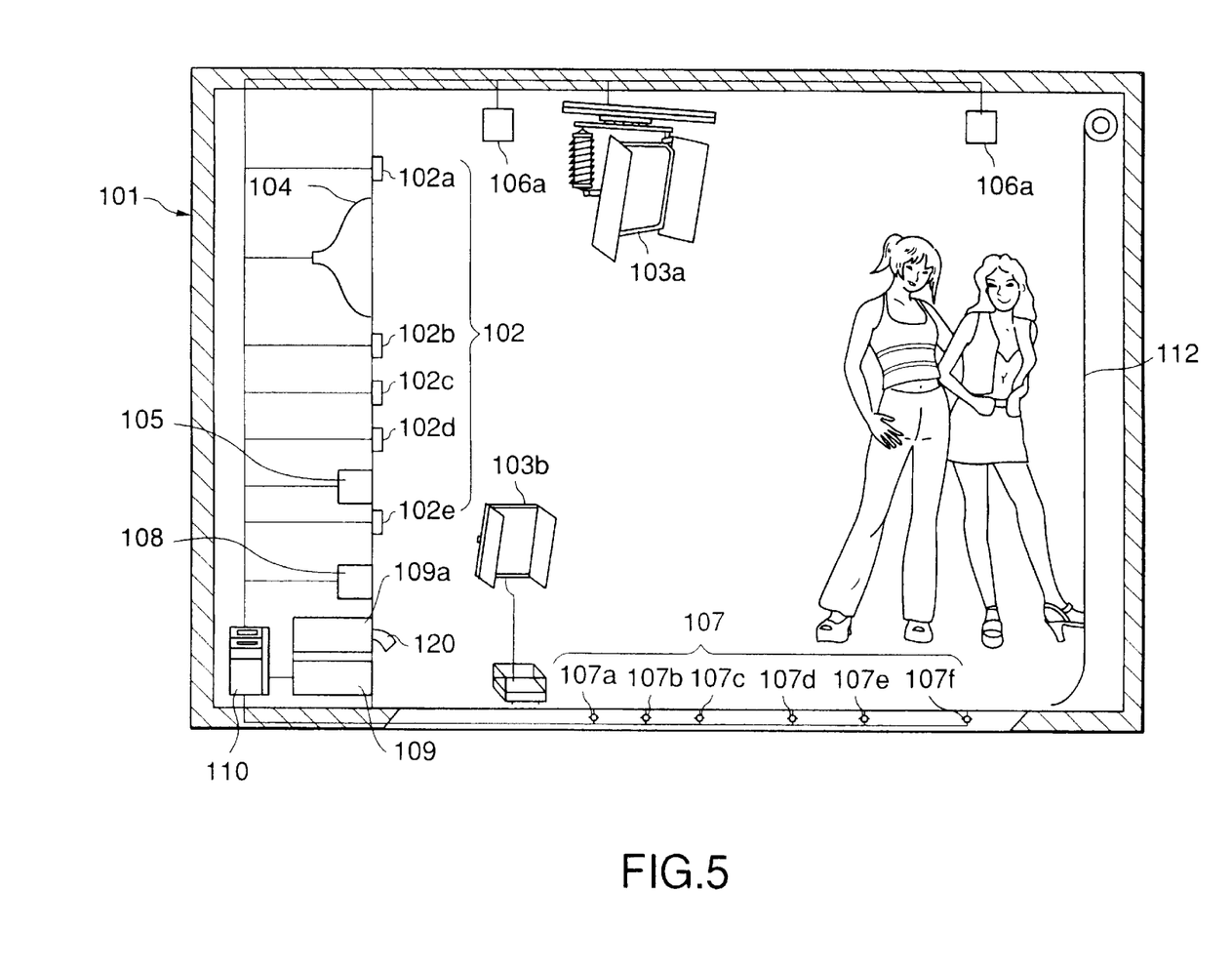
FIG. 5 is a side view of a photographing system in a second embodiment according to the present invention.
Figure 6:
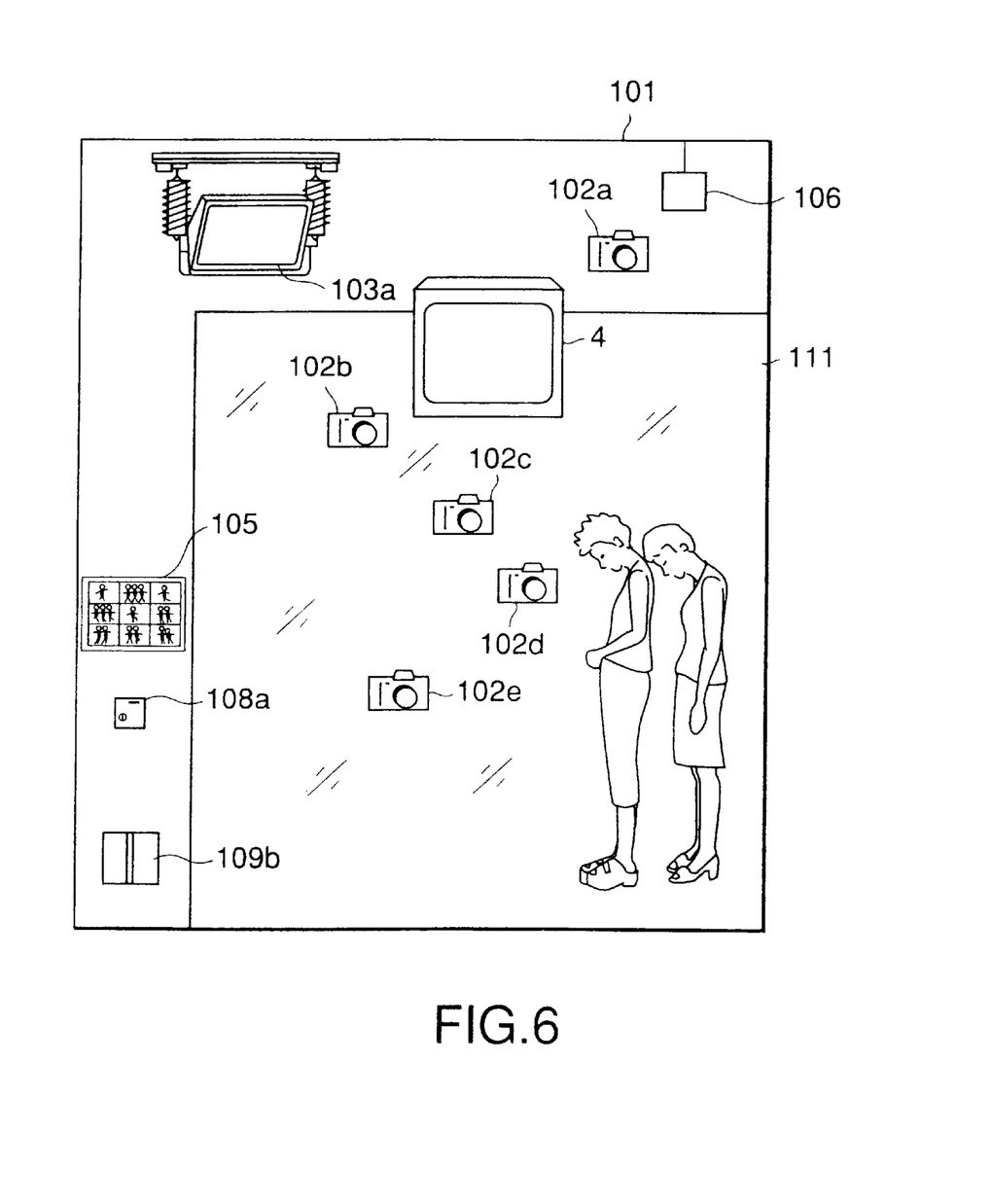
FIG. 6 is a front view of the photographing apparatus in the second embodiment.

A photographing system in a second embodiment will be described hereinafter with reference to FIGS. 5 and 6 showing the photographing system in a side view and a front view, respectively.

Referring to FIGS. 5 and 6, the photographing system comprises a photographing box 101, cameras 102 installed in the photographing box 101, a stroboscopic lighting system 103 installed in the photographing box 101, a monitor display 104 installed in the photographing box 101, an operation monitor display 105 disposed adjacent to the monitor display 104, speakers 106a installed in the photographing box 101, pilot lamps 107a, 107b, 107c, 107d, 107e and 107f, which will inclusively be indicated at 107, installed in the photographing box 101, a rental fee collecting machine 108, a printing unit 109 installed in the photographing box 101, a computer 110 installed in the photographing box 101, a mirror 111 placed in the photographing box 101, and a screen 112 placed in the photographing box 101. Walls forming the photographing box 101 are soundproofed. The photographing box 101 is an unmanned photo studio having a space large enough for three to five adults to move freely around therein.

The mirror 111 is attached to the inner surface of a front wall of the photographing box 101 to enable users to recognize their poses. The mirror 111 has a size and is disposed at a position such that light emitted by the stroboscopic lighting system 113 may not be reflected by the mirror 111 and may not cause halation. The screen 112 is suspended on the inner surface of a back wall of the photographing box 101, and a part of the screen 112 near the floor is curved to form a horizon back capable of creating a deep scenery.

The cameras 102 (five cameras 102a, 102b, 102c, 102d and 102e) are digital cameras provided with a CCD having more than about 1,500,000 pixels and capable of producing a high-quality image.

The cameras 102 are installed at different positions for photographing at different camera angles, respectively.

The stroboscopic lighting system 103 comprises a stroboscopic lighting unit 103a, i.e., a key light, suspended from the ceiling, and a stroboscopic lighting unit 103b, i.e., a fill-in light, placed on the floor to illuminate deep shadows formed by the key light. The photographing box 101 may be provided additional stroboscopic lighting units as back lights and effect lights, provided that the additional stroboscopic lighting units do not cause detrimental effects in combination with the mirror 111.

The monitor display 104 is a CRT to display information about photographing procedures and guidance for the user. The monitor display 104 is placed in a front part of the photographing box 101 on the level of the user's eyes. For example, matters to be attended to and directions for photographing may be displayed on the monitor display 104 before photographing operations are started, and pictures of professional photographic models may be displayed for reference during the photographing operations.

The operation monitor display 105 is a liquid crystal display provided with a touch switch panel to be operated by the user for proceeding with photographing, selecting a picture and specifying the size and the number of prints. For example, methods of operating the photographing system are explained by displaying instructions on the monitor display 104, and then, a desired photographing mode can be selected out of a plurality of possible photographing modes, a desired picture can be selected out of twenty to thirty pictures, and the size and the number of prints can be specified by operating the operation monitor display 105.

The speakers 106a are suspended from the ceiling to deliver preparatory explanations before the photographing operation is started, and delivers advice and sound effects during the photographing operation. The cameras 102 are digital cameras and do not generate a shutter sound. Therefore, low sound effects simulating a shutter sound and a film winding sound that will be generated by a single-lens reflex camera are generated by the speakers 106a to produce the illusion of an actual photo studio which is used by professional photographers. The speakers 106a and the monitor display 104 constitute a user guidance system.

The six pilot lamps 107 (taking position indicating means) are arranged on the floor. Appropriate one of the pilot lamps 107 flickers to indicate an optimum taking position to the user.

The rental fee collecting machine 108 examines coins or bank notes deposited therein for the authentication of the payment, and manages the number of credit cards and change.

Figure 8:
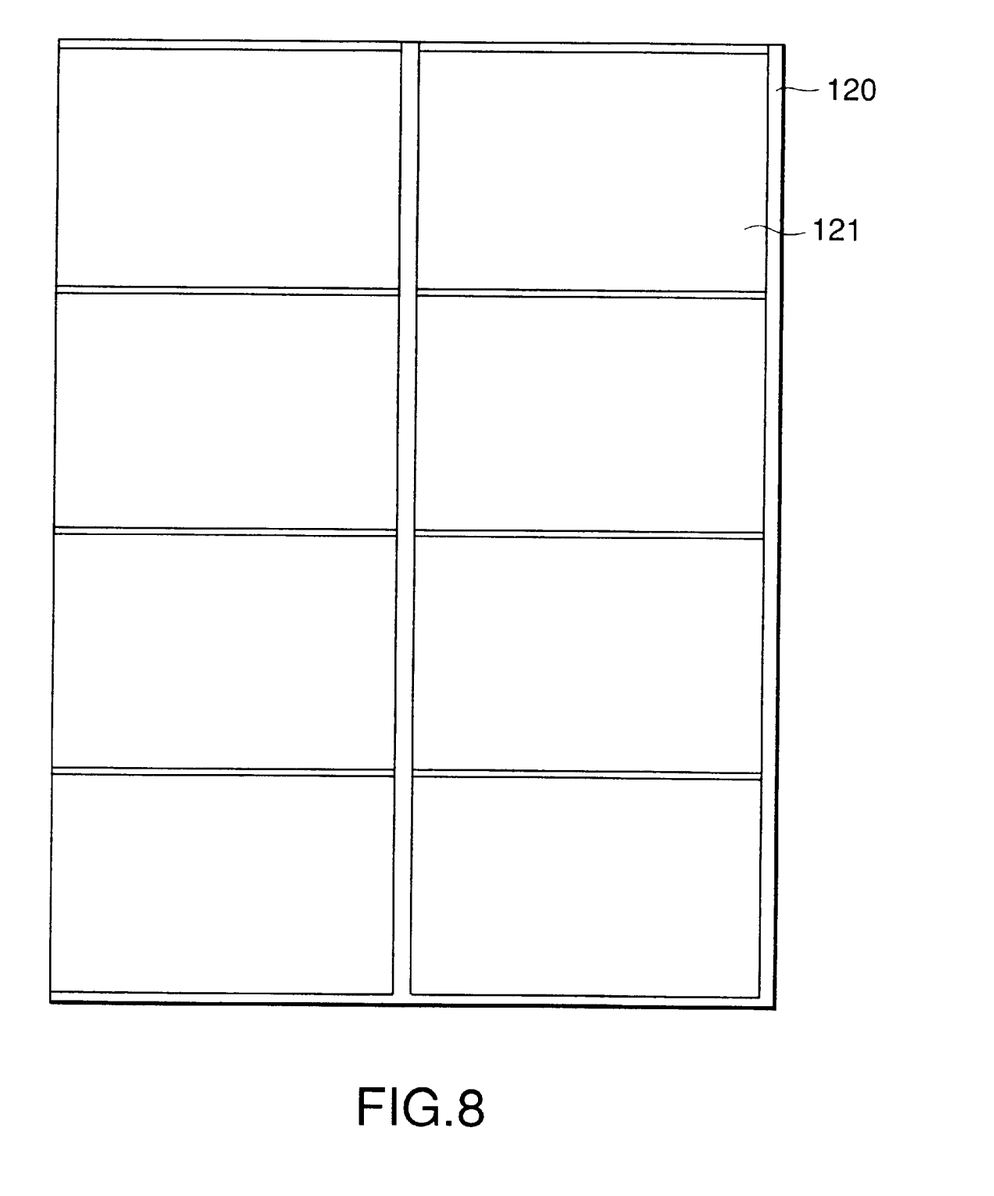
FIG. 8 is a pictorial view of assistance in explaining the size of prints to be produced by a printing unit included in the photographing system of FIG. 5.

The printing unit 109 (printing means) is a sublimation transfer full-color printer provided with a cutting device 108a. The printing unit 109 permits optional print size selection. As shown in FIG. 8, the printing unit 109 is able to produce a print carrying a plurality of pictures on a sheet of the size A4. In FIG. 8, eight pictures are printed on a sheet. The printing unit 109 permits also the selection of a full-size print 120 of the size A4 or a plurality of divisional prints 121 of a minor size.

The computer 110 comprises a control unit for controlling the photographing system, and a storage unit for storing control programs, video and audio data for guidance and photographic data obtained by photographing. For example, the control unit provides shutter release signals to operate the digital cameras 102, gives synchronized lighting signals to the stroboscopic lighting units 103, gives video signals representing pictures to be displayed on the monitor display 104, gives picture signals to and receives operation signals from the operation monitor display 105, gives audio signals to the speakers 106a, gives lighting signals to the pilot lamps 107, exchanges signals with the rental fee collecting machine 108, and gives print signals to the printing unit 109.

Figure 7:
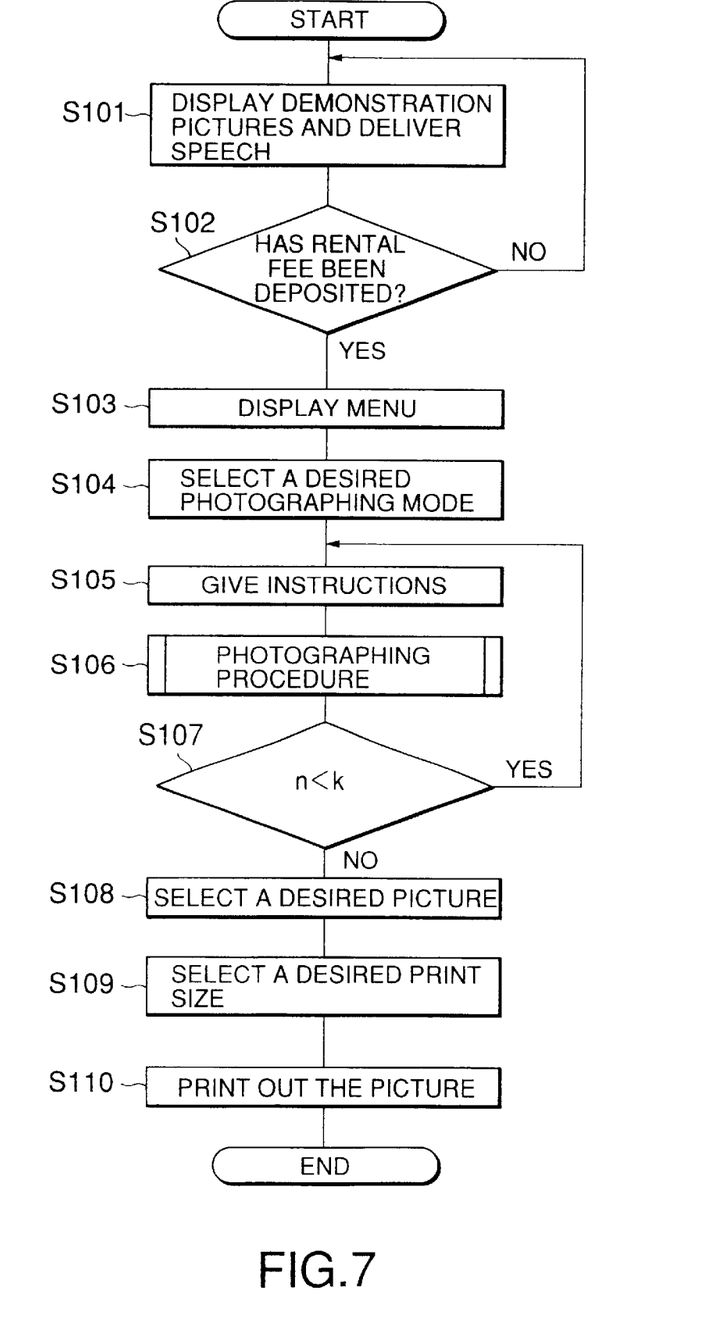
FIG. 7 is a flow chart of an operating procedure for operating the photographing system of FIG. 5.

FIG. 7 is a flow chart of a control program for controlling the photographing system in the second embodiment.

The photographing system displays demonstration pictures and delivers speech in step S101. If it is decided in step S102 that a predetermined number of coins have been deposited in the rental fee collecting machine 108, a menu is displayed on the operation monitor display 105 in step S103 to prompt a user to select a photographing mode out of a plurality of photographing modes. For example, the following photographing modes are available.

A: Professional Photographer Mode

Guidance is given by the speech and pictures of an actual professional photographer.

B: Magazine Model Mode

Users simulate models for women's magazines, fashion magazines or men s fashion magazines.

C: Two-Shot Mode

A photographing procedure is designed to photograph two persons, such as lovers or intimate friends, in a two-shot picture.

D: Commemorative Photographing Mode

A photographing procedure is designed to take commemorative pictures commemorating special occasions, such as Shichigosan festival, Omiyamairi celebration, Coming-off-Age Day, the day of entrance ceremony, the day of graduation ceremony, birthdays and memorial (days, portraits and testimonial photographs.

E: Free Mode

In step S104, the user operates the operation monitor display 105 to select a desired photographing mode out of the foregoing photographing modes. Photographing guidance is given previously in pictures displayed on the monitor display 104 and speech delivered by the speakers 106a in step 104, and then a photographing operation is started in step S106.

In any one of the photographing modes A to D, pictures of professional models are displayed on the monitor display 104, and instructions are give to the user to pose in professional photographer's voice to produce the illusion of an actual photo studio. The user is able to learn poses from the pictures displayed on the monitor display 104, is instructed to act by speech, and is able to find an optimum taking position from the flickering one of the pilot lamps 107 (107a to 107f).

After a predetermined number k of photographs have been taken (S107), k frames of pictures in different poses are displayed on the operation monitor display 105. The user operates the touch switch panel of the operation monitor display 105 to select a desired picture in step S108, A desired size of prints is selected in step S109. In step S110, the printing unit 109 prints out the selected picture and delivers a print through an outlet 109b.

As is apparent from the foregoing description, the photographing system in the second embodiment uses the five digital cameras 102 capable of producing high-quality pictures, provides photographing guidance in pictures and voices by the monitor display 104 to instruct the user for posing and such, and is capable of carrying out the photographing operations respectively suiting the foregoing photographing modes and of producing an atmosphere proper for the selected photographing mode.

The pilot lamps 107 placed on the floor indicates an optimum taking position exactly for the user. The size of prints is controlled by software and hence pictures can be delivered in prints of various sizes.

Although the it is preferable that the photographing box is soundproof, one side of the photographing box may be open if the place of installation permits, and the photographing box may be installed in another facility, such as a karaoke singing box, i.e., a soundproof box equipped with microphones, speakers, a music player for playing background music numbers and such.

The photographing box may be provided, in addition to the stroboscopic lighting units, with lighting devices, such as reflector panels, umbrella reflectors and diffusers.

Although the invention has been described in its preferred embodiments with a certain degree of particularity, obviously many changes and variations are possible. It is therefore to be understood that the present invention may be practiced otherwise than as specifically described herein without departing from the scope and spirit thereof.

What is claimed is:

1. A photographing system comprising:

a photographing box having a size greater than that of a whole body of a user standing in the photographing box, for accommodating the user as a subject therein and allowing the user to change a pose of the user therein;

lighting means disposed in the photographing box;

photographing means disposed in the photographing box and capable of photographing the whole body of the user standing in the photographing box and of producing photographic data;

printing means for producing prints of pictures on the basis of photographic data given thereto by the photographing means;

guidance means disposed in the photographing box to guide the user for posing by images and sounds;

photographing mode selecting means for producing photographing mode selecting data specifying photographing modes;

pilot lamps placed on a floor of the photographing box, the pilot lamps flickering at a particular time to indicate an optimum picture taking position to the user; and synchronizing control data storage means for giving synchronizing control data selected on the basis of the photographing mode selecting data provided by the photographing mode selecting means and for controlling the lighting means, the photographing means, the printing means, the guidance means, and the pilot lamps.

2. The photographing system according to claim 1 further comprising:

photographic data storage means for storing the photographic data provided by the photographing means;

editing means for editing the photographic data read from the photographic data storage means to provide edited data;

edited data storage means for storing the edited data;

display means for displaying pictures corresponding to the photographic data and/or the edited data by reading the photographic data stored in the photographic data storing means and/or the edited data stored in the edited data storing means;

audio data storage means for storing audio data;

audio reproducing means for reproducing sounds represented by the audio data stored in the audio data storage means and delivering the reproduced sounds by a speaker; and synchronizing control data storage means for storing synchronizing control data;

wherein the synchronizing control means controls the lighting means, the photographing means, the printing means, the photographic data storage means, the editing means, the edited data storage means, the display means, the audio data storage means and the audio reproducing means on the basis of the synchronizing control data read from the synchronizing control data storage means.

3. The photographing system according to claim 1, wherein
the lighting means comprises a plurality of lighting units for lighting at different lighting angles, respectively, and the lighting units specified by the synchronizing control means are used for lighting.

4. The photographing system according to claim 1, wherein
the lighting means comprises stroboscopic light sources capable of emitting an instantaneous flash of light, and ordinary light sources capable of continuously emitting light.

5. The photographing system according to claim 1, wherein
the photographing means comprises a plurality of photographing units for photographing at different camera angles, respectively, and the photographing units selected by the synchronizing control means are used for photographing.

6. The photographing system according to claim 1 further comprising a movable stage in the photographing box and a stage moving means for changing the position and the angle of the movable stage installed;
wherein the photographing means is fixedly held on the movable stage, and the synchronizing control means controls the stage moving means to move the movable stage to set a specified camera angle.

7. The photographing system according to claim 2, wherein
the synchronizing control means provides an edit command signal in a predetermined series on the basis of synchronizing control data read from the synchronizing control data storage means, and the editing means produces edited data by an editing process specified by the edit command signal.

8. The photographing system according to claim 2, wherein
the synchronizing control means provides a display command signal in a predetermined series on the basis of the synchronizing control data read from the synchronizing control data storage means, and the display means reads the edited data from the editing means and displays a picture in response to the display command signal.

9. The photographing system according to claim 2 further comprising a cataloged data storage means for storing a plurality of previously cataloged data;
wherein the editing means produces edited data by combining photographic data on the basis of predetermined cataloged data read from the cataloged data storage means.

10. The photographing system according to claim 9, wherein
the cataloged data includes background picture data and/or foreground picture data.

11. The photographing system according to claim 2, wherein
the editing means carries out an arraying process for producing edited data by arraying a plurality of photographic data and/or plurality of edited data.

12. The photographing system according to claim 11, wherein
the printing means reads edited data processed by the arraying process by the editing means and prints out a picture represented by the edited data.

13. The photographing system according to claim 12, wherein
the display means displays a plurality of pictures on the basis of edited data processed by the arraying process by the editing means and is provided with picture selecting means for producing a picture selecting data specifying a picture selected by a selection input out of the plurality of pictures displayed in an array by the display means, and
the printing means reads edited data specified by the picture selecting data from the edited data storage means and prints out a picture represented by the edited data.

14. The photographing system according to claim 13, wherein
the printing means produces a printed picture on the basis of a print charge collection signal indicating the collection of a print charge, and the picture selection data.

15. The photographing system according to claim 2, wherein
the synchronizing control means starts its operation upon the confirmation of reception of both a rental fee collection signal indicating the collection of a rental fee, and a start signal entered by a user.

16. The photographing system according to claim 1, wherein
the printing means selectively determines the size and/or the number of pictures and prints out the pictures on a sheet of photographic paper of a set size.

17. The photographing system according to claim 1, wherein
the photographing box is soundproof.

* * * * *

UNITED STATES PATENT AND TRADEMARK OFFICE
CERTIFICATE OF CORRECTION

PATENT NO. : 6,317,560 B1
DATED : November 13, 2001
INVENTOR(S) : Kazuhiro Kawabata et al.

It is certified that error appears in the above-identified patent and that said Letters Patent is hereby corrected as shown below:

Title page,
Item [30], correct the first Foreign Application listed from "9-3433640" to -- 9-343640 --.

Signed and Sealed this

Twenty-first Day of May, 2002

Attest:

Attesting Officer

JAMES E. ROGAN
Director of the United States Patent and Trademark Office